United States Patent [19]

Kuwica

[11] Patent Number: 4,587,868
[45] Date of Patent: May 13, 1986

[54] FILING DEVICE FOR CHAIN SAW CHAIN DEPTH GAUGES

[76] Inventor: Daniel Kuwica, 1756 Shannon Ct., Coquitlam, British Columbia, Canada, V3J 6C6

[21] Appl. No.: 768,723

[22] Filed: Aug. 23, 1985

[51] Int. Cl.⁴ .............................................. B23D 63/16
[52] U.S. Cl. ............................................ 76/36; 29/80
[58] Field of Search ............... 76/36, 25 A, 31; 29/78, 29/80

[56] References Cited

U.S. PATENT DOCUMENTS

| | | | |
|---|---|---|---|
| 2,297,010 | 9/1942 | Milano | 76/31 |
| 2,594,821 | 4/1952 | Stone et al. | 76/25 A |
| 3,327,567 | 6/1967 | Penberthy | 76/36 |
| 3,518,900 | 7/1970 | Ehlem et al. | 76/36 |
| 3,796,113 | 3/1974 | Granberg | 76/25 A |
| 4,012,969 | 3/1977 | Granberg | 76/36 |
| 4,327,605 | 5/1982 | Strojny | 76/36 |
| 4,412,463 | 11/1983 | Beerens | 76/36 |

FOREIGN PATENT DOCUMENTS 604043 10/1934 Fed. Rep. of Germany .......... 76/36

Primary Examiner—Roscoe V. Parker
Attorney, Agent, or Firm—Carver & Co.

[57] ABSTRACT

A device for controlling filing of a depth gauge of a saw chain has an elongated file holder with a center portion having clips for holding a file. The filing surface of the file faces outwardly from the holder. The file holder has a flat surface facing outwardly on a first side of the center portion and has a straight edge facing outwardly on a second side of the center portion. The flat surface and the straight edge are positioned relative to the center portion such that, after a depth gauge of a first cutter link has been filed to a desired level, the flat surface rests against the cutter edge of the first cutter link while the straight edge engages the non-cutter link of the chain and a back of a second cutter link.

11 Claims, 4 Drawing Figures

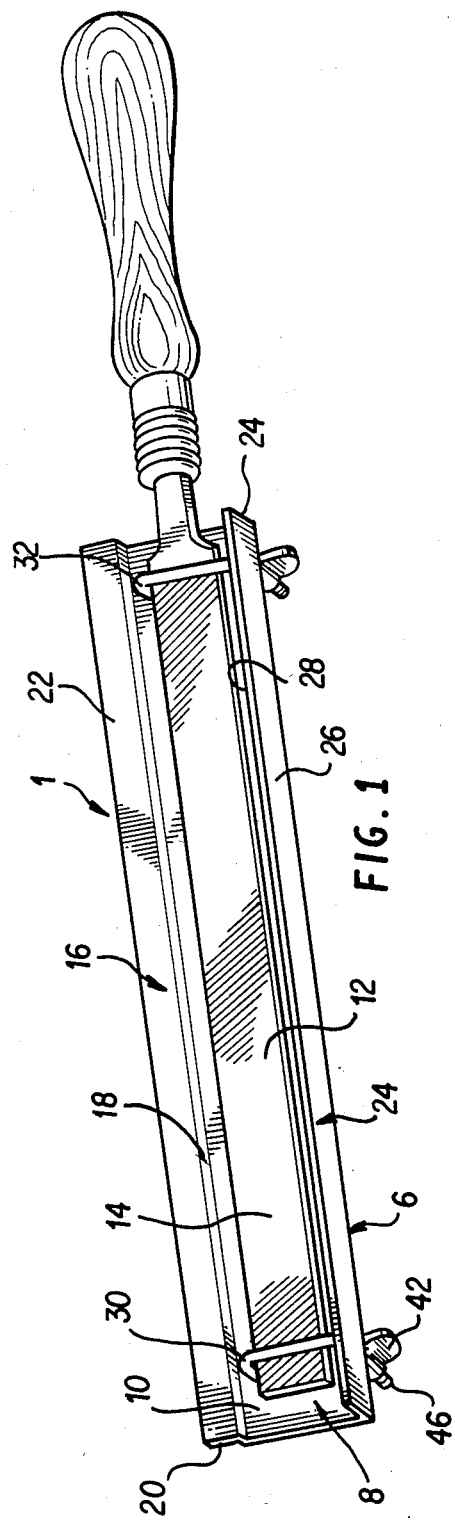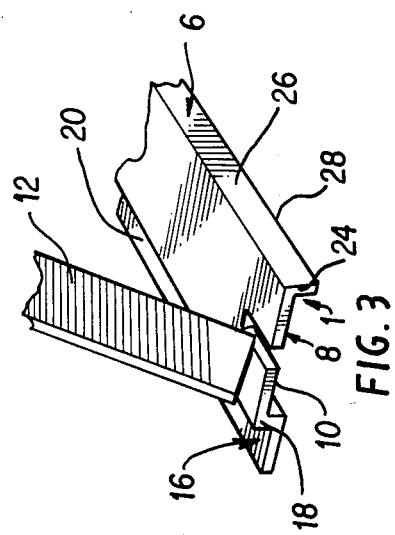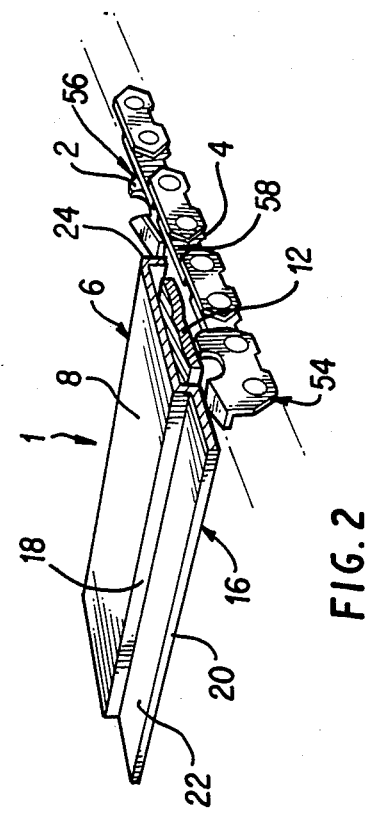

FILING DEVICE FOR CHAIN SAW CHAIN DEPTH GAUGES

BACKGROUND OF THE INVENTION

The invention relates to a device for controlling the filing of a depth gauge of a cutter link of a chain saw chain.

The cutter links or cutter teeth, as they are also known, of a standard chain saw chain include a depth gauge and a cutter edge separated by a space. The depth gauge preceeds the cutter edge in the direction of travel of the chain. The depth gauge should project outwardly slightly less than the cutter edge and thus determines the amount of material removed in each pass of each cutter edge. The amount of material removed is approximately the difference between the height of the depth gauge and the height of the cutter edge.

The cutter edge is normally sharpened by use of a round file. Devices have been developed for holding round files for sharpening saw chains as found in the U.S. Pat. Nos. 3,327,567 to Penberthy, 3,518,900 to Ehlen and 4,012,969 to Granberg. The latter shows an adjustable saw chain guide and holder.

A problem arises however when the cutter edge is sharpened. This reduces the height of the cutter edge so that the outward projection of the cutter edge is reduced relative to the depth gauge. This reduces cutting efficiency of the cutter link. The efficiency can be restored by filing the depth gauge until the proper relationship is restored. However, the depth gauge must not be filed too much or the cutting edge will take too deep a bit which increases the likelihood of kick back and potential serious injury to the user.

Devices have been developed for adjusting the relationship between the depth gauge and the cutter edge. An example is found in U.S. Pat. No. 3,796,113 to Granberg which shows a depth gauge attachment using a rotary grinder. The device rests on the tips of two adjacent cutting teeth. Unfortunately, this leads to inaccuracies because the heights of adjacent teeth are not necessarily the same. A device of this type gauges the height of one depth gauge partly in relation to the height of the cutting edge of an adjacent cutter link. The height of each depth gauge should be determined solely in relation to the cutter edge on the same cutter link.

Other devices have been developed for filing depth gauges. One example is found in the U.S. Pat. No. 4,412,463 to Beerens which discloses a guide for resting on the tip of a cutting edge and having apertures through which the depth gauge projects. A file is then placed on a plate and operated to file away the depth gauge until is it flush with the plate. U.S. Pat. No. 2,594,821 to Stone shows another gauge for filing saw chains. Such devices have the disadvantage that the guide or gauge must be held by one hand, while the file is operated by the other. This is awkward in practice. In addition, the devices are typically adapted only for use on specified types of chains.

U.S. Pat. No. 2,297,010 to Milano shows a saw filing device including a bar having clamps for securing the file.

The prior art does not offer a solution which permits simple filing in the conventional manner where both hands are used on the file and without the need for holding a depth gauge of some kind and which can be used on essentially all chains having a common pitch.

SUMMARY OF THE INVENTION

The invention provides a device for controlling filing of a depth gauge of a chain saw chain having a plurality of cutter links spaced-apart by non-cutter links. Each cutter link has a depth gauge, a top cutter edge and a back. The device comprises an elongated file holder with a center portion having means for holding a file. The file holder has a flat surface along a first side of the center portion and a longitudinally straight edge along a second side of the center portion. The flat surface and the straight edge face outwardly in a common direction with a filing surface of a file held in the centre portion. The flat surface and the straight edge are positioned relative to the center portion, such that after a depth gauge of a first cutter link has been filed to a desired level, the flat surface rests against the cutter edge of the first cutter link while the straight edge engages a non-cutter link and the back of a second cutter link which is adjacent the first cutter link.

DESCRIPTION OF THE DRAWINGS

FIG. 1 is a perspective view of a device for regulating filing of a depth gauge of a chain saw chain according to embodiment of the invention, showing a file mounted thereon;

FIG. 2 is a fragmentary perspective view showing a portion of the device mounted on a chain saw chain;

FIG. 3 is a fragmentary view of a variation having a slot for gauging a proper file;

DESCRIPTION OF THE PREFERRED EMBODIMENTS

Figure 4:
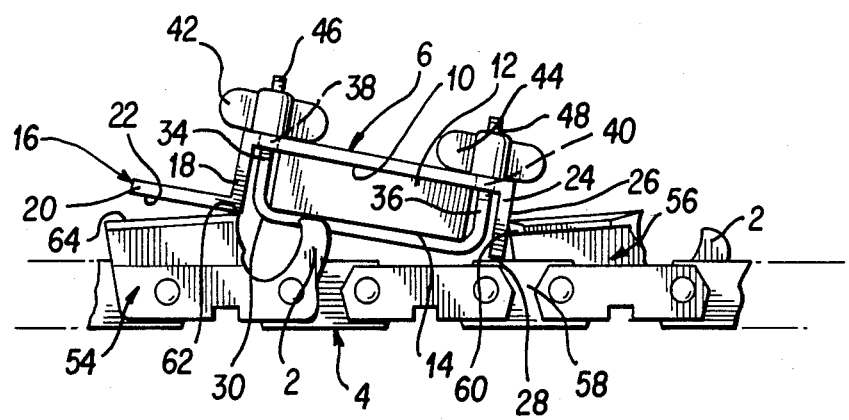
FIG. 4 is an in view of the device shown in position on the chain saw chain.

Referring to the drawings, FIG. 1 illustrates a device 1 for regulating filing of a depth gauge 2 of a chain saw chain 4 shown in FIGS. 2 and 4. The device includes an elongted file holder 6 which is substantially rectangular in shape, having a center portion 8 in the shape of a channel having a flat surface 10 for receiving a flat file 12 having a filing surface 14 facing outwardly in a direction which is perpendicular to surface 10.

The channel-shaped center portion is delineated on one side by a first longitudinal flange 16 which has two portions. A first portion 18 extends perpendicularly from the flat surface 10 of the center portion. A second portion 20 is connected to the first portion and is perpendicular thereto. Its flat surface 22, facing in the same direction as the cutting surface of the file, is parallel to flat surface 10 of the the center portion 8. As may be observed, flat surface 22 extends longitudinally along one side of the center portion 8 and is spaced perpendicularly outwards therefrom by the first portion 18.

The device has a second flange 24 along a side of the center portion 8 opposite the first flange 16. This flange is flat and extends perpendicularly from surface 10, having a flat outer surface 26 and a longitudinally straight edge 28 which faces outwardly in the same direction as the filing surface of the file and flat surface 22 of the first flange 16.

The device also includes identical clamps 30 and 32 for holding the file 12 against flat surface 10. As shown in FIG. 4 for clamp 30, each of the clamps is substantially U-shaped, each having two threaded shanks 34 and 36. These project through larger apertures 38 and 40 in the file holder. Wing-nuts 42 and 44 threadedly engage threaded ends 46 and 48 of the shanks. Thus, when the wing-nuts 42 and 44 are tightened, the file is tightly held between the clips and the flat surface 10.

The device as illustrated is intended to hold the flat file 14. The file must be the correct thickness in order for the device to operate properly. For this reason, the device may have a slot 52, illustrated in the embodiment FIG. 3, which extends inwardly at one end of the file holder. The slot is the proper width for a file which accordingly may be gauged by placing it in the slot. As observed best in FIG. 4, flat surface 22 and straight edge 28 are spaced perpendicularly outwards from flat surface 10 a distance such that they are beyond filing surface 14 of the file.

Operation

Referring to FIGS. 2 and 4, the device is used for filing the depth gauge 2 on a cutter link 54 of the chain saw chain 4 and is used successively on other cutter links, such as cutter link 56, each of which has a depth gauge 2. The straight edge 28 is positioned so it rests on a non-cutter link 58, commonly known as a "side link" while outer surface 26 contacts back 60 of the next adjacent cutter link 56 to the cutter link 54 being filed. Flat surface 22 is adapted to slidably engage tip 62 of cutter edge 64 on cutter link 54. For this reason, the file holder is preferably of metal and surface 22 at least is hardened so it is harder than cutter edge 64. This allows surface 22 to glide easily over the cutter edge without causing damage to either surface 22 or the cutter edge of the saw chain. The depth gauges are generally chromed on the outer side and filing is correctly done against the unchromed side. The file is reversed in the holder to file depth gauges on the opposite side.

Surface 22 and the straight edge 28 are located distances outwardly from surface 10 such that when a file 12 having a proper thickness is held in the file holder, the depth gauge 2 is filed the proper amount, for example 0.025" below the height of the tip of the cutter edge, by drawing the file back and forth in the conventional manner along its longitudinal axis. It may be noted that, initially, straight edge 28 rests against link 58 and outer surface 26 contacts back 60 of link 56. At the same time, the filing surface 14 of the file rests on depth gauge 2. Flat surface 22 initially does not contact tip 62 because the depth gauge 2 is typically projecting too far outwardly in relation to cutter edge 64. The device could be rocked so that surface 22 does contact tip 62, but, in this case, straight edge 28 would not contact link 58 and so proper filing would not occur. The file is drawn back and forth until depth gauge 2 is filed an amount efficient so that straight edge 28 simultaneously contacts link 58, while surface 22 contacts tip 62 of cutter edge 64. Further filing produces no more effect because the device is supported by the straight edge 28 contacting link 58 and surface 22 contacting cutter edge 64. As may be observed best in FIGS. 2 and 4, the filing action has the effect of angling the tip of depth gauge 2 downwardly towards the corner formed by link 58 and back 60 of link 56. This is the desirable configuration. Typically the device is configured so that, when the proper thickness file is used, the tip 62 of the cutter edge 64 projects approximately 0.025" beyond the tip of depth gauge 2.

Devices of different sizes and configurations are required for saw chains having chains with different pitches. For example, typical pitches are 0.325", 0.365", 0.375", 0.404", 0.5", and 0.775". However, a device adapted for any given pitch fits practically any chain saw chain and is not restricted to the chain of one manufacturer.

It should be noted that each depth gauge is filed independently of the heights of adjacent depth gauges which may vary considerably.

What is claimed is:

1. A device for controlling filing of a depth gauge of a chain saw chain, having a plurality of cutter links spaced-apart by non-cutter links, each cutter link having a depth gauge, a top cutter edge and a back, the device comprising:

an elongated file holder having a center portion with means for holding a file, a flat surface along a first side of the center portion, and a straight edge along a second side of the center portion, the flat surface and the straight edge facing outwardly in one common direction with a filing surface of a file held in the center portion, the flat surface and the straight edge being positioned relative to the center portion such that, after a depth gauge of a first cutter link has been filed to a desired level, the flat surface rests against the cutter edge of the first cutter link while the straight edge engages a non-cutter link and the back of a second cutter link which is adjacent the first cutter link.

2. A device as claimed in claim 1, wherein the center portion is a longitudinal channel delineated on each side by the flat surface and the straight edge which are raised outwardly in said direction.

3. A device as claimed in claim 2, wherein the holder has a first longitudinal flange on a first side of the center portion and a second longitudinal flange on the second side thereof, the flat surface being on the first flange and the straight edge being on the second flange.

4. A device as claimed in claim 3, wherein the first flange has a first portion extending perpendicularly from the center portion of the holder and a second portion connected to the first portion and being perpendicular thereto, the flat surface being on the second portion.

5. A device as claimed in claim 4, wherein the center portion has a flat surface for receiving a flat file, the flat surface of the first flange being parallel to the flat surface of the center portion.

6. A device as claimed in claim 5, wherein the first and second flanges extend outwardly from the center portion a sufficient distance so that the flat surface of the first flange and the straight edge of the second flange are outwardly directed beyond the filing surface of the file in said one direction.

7. A device as claimed in claim 1, wherein the means for holding comprises a pair of generally U-shaped clips, the clips being spaced-apart on the center portion, each clip having two threaded shanks extending slidably through apertures in the center portion, and bolt means on each of the shanks for tightening the file between the clip and the center portion.

8. A device as claimed in claim 1, further comprising a slot in the file holder for gauging a file having a proper thickness for the device.

9. A device as claimed in claim 1, wherein the flat surface and the straight edge are spaced outwardly in the one direction distances such that the depth gauge is angled towards a corner formed by the non-cutter link and the second cutter link when the depth gauge is filed by the device to the desired level.

10. A device as claimed in claim 1, wherein the flat surface and the straight edge are spaced downwardly in the one direction distances such that the cutter edge of the first cutter link extends beyond the depth gauge of the first cutter link when the straight edge is against the non-cutter link and the back of the second cutter link and the flat surface is simultaneously against and the cutter edge of the first cutter link.

11. A device as claimed in claim 1, wherein the device is of metal, the flat surface being harder than the cutter edge.

* * * * *